United States Patent
Spurling et al.

(10) Patent No.: US 11,453,285 B2
(45) Date of Patent: Sep. 27, 2022

(54) VEHICLE MOUNT

(71) Applicant: Ford Global Technologies, LLC, Dearborn, MI (US)

(72) Inventors: Michael Spurling, Romford (GB); Joergen Hilmann, Leverkusen (DE); Dominik Mueller, Euskirchen (DE); Daniel Meckenstock, Wuppertal (DE); Marius Sawatzki, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 16/573,515

(22) Filed: Sep. 17, 2019

(65) Prior Publication Data

US 2020/0102017 A1 Apr. 2, 2020

(30) Foreign Application Priority Data

Sep. 27, 2018 (GB) ..................................... 1815757

(51) Int. Cl.
*B60K 5/12* (2006.01)
*B62D 24/00* (2006.01)

(52) U.S. Cl.
CPC .............. *B60K 5/12* (2013.01); *B60K 5/1208* (2013.01); *B62D 24/00* (2013.01)

(58) Field of Classification Search
CPC ........ B60K 5/12; B60K 5/1208; B62D 24/00; B62D 24/02
USPC ...................................................... 296/35.1
See application file for complete search history.

(56) References Cited

U.S. PATENT DOCUMENTS

| 2,687,270 | A | 8/1954 | Robinson |
| 2,751,992 | A | 6/1956 | Nallinger |
| 3,704,876 | A | 12/1972 | Schubeck |
| 4,895,350 | A | 1/1990 | School et al. |
| 5,306,121 | A | 4/1994 | Heflin et al. |
| 5,967,251 | A | 10/1999 | Türl et al. |
| 7,594,690 | B2* | 9/2009 | Hedderly ............... B60J 5/0405 |
| | | | 16/242 |
| 8,091,954 | B2* | 1/2012 | Blin .................... B62D 33/0604 |
| | | | 296/190.01 |
| 10,337,585 | B2* | 7/2019 | Kojima .................... F16F 1/371 |
| 10,556,602 | B2* | 2/2020 | Tokuda .................. B61D 17/12 |
| 10,836,244 | B2* | 11/2020 | Inoue .................... B60K 5/1283 |

(Continued)

FOREIGN PATENT DOCUMENTS

| CN | 103253121 A | 8/2013 |
| CN | 208006693 U | 10/2018 |

(Continued)

OTHER PUBLICATIONS

Machine Translation of CN103253121A, printed from the EPO website, Oct. 22, 2021.*

(Continued)

*Primary Examiner* — Jason S Morrow
(74) *Attorney, Agent, or Firm* — Vincent Mastrogiacomo; McCoy Russell LLP

(57) ABSTRACT

A vehicle mount may comprise a member attach to a frame of a vehicle. Another mount member may comprise limbs. A space between limbs may receive an arm attachable to a component of the vehicle. The second member may attach to the first member such that the space between the first and second limbs forms an opening for receipt of the arm.

19 Claims, 9 Drawing Sheets

(56) References Cited

U.S. PATENT DOCUMENTS

| | | | |
|---|---|---|---|
| 10,870,342 B2* | 12/2020 | Takakura | F16F 15/08 |
| 2002/0015647 A1 | 2/2002 | Nakagaki et al. | |
| 2011/0041795 A1* | 2/2011 | Scharf | B23P 13/04 |
| | | | 123/195 A |

FOREIGN PATENT DOCUMENTS

| | | | | |
|---|---|---|---|---|
| EP | 2918434 A2 | | 9/2015 | |
| FR | 2340834 A1 | | 9/1977 | |
| GB | 2417541 A | * | 3/2006 | B60K 5/1208 |
| JP | 2005075223 A | | 3/2005 | |
| JP | 2012116242 A | | 6/2012 | |

OTHER PUBLICATIONS

Great Britain Intellectual Property Office, Combined Search and Examination Report under Sections 17 and 18(3) Issued in Application No. GB1815757.8, dated Mar. 28, 2019, 8 pages.

* cited by examiner

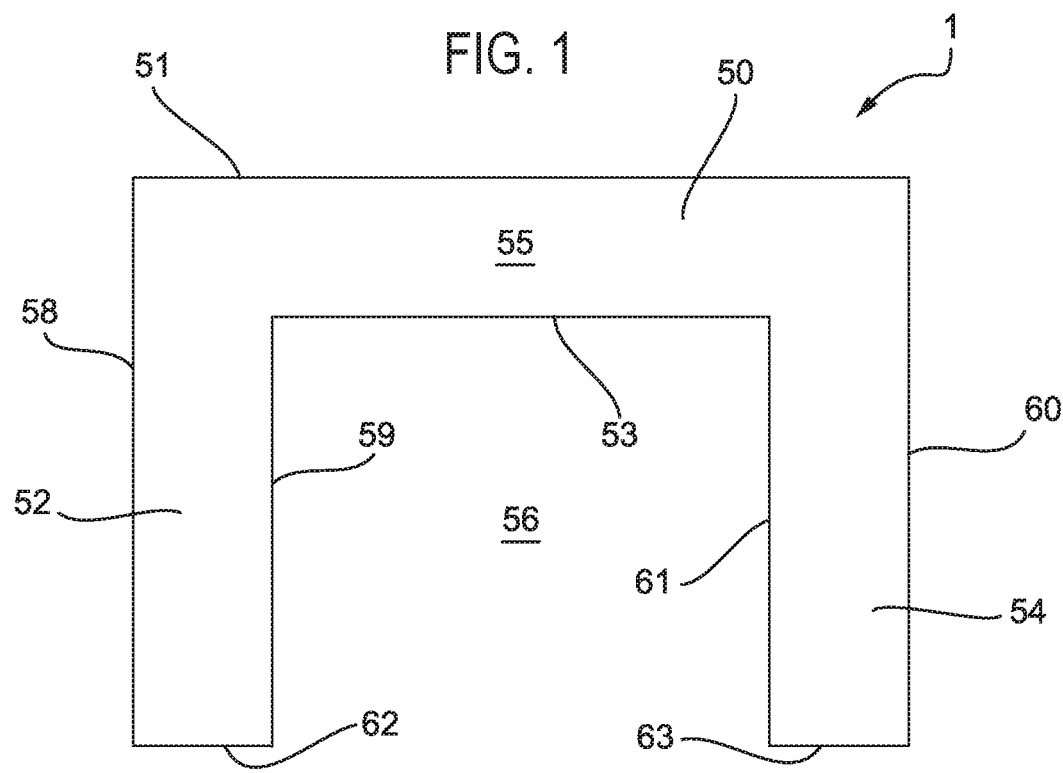
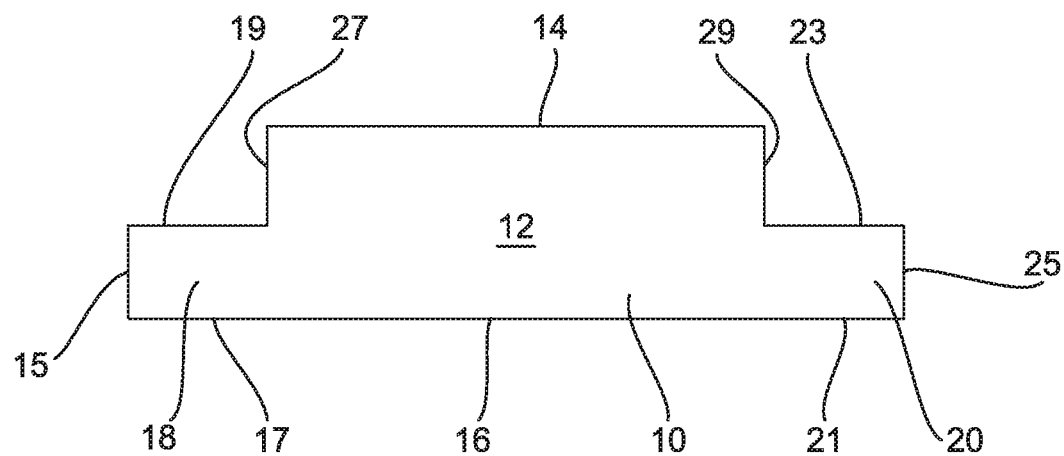
FIG. 1

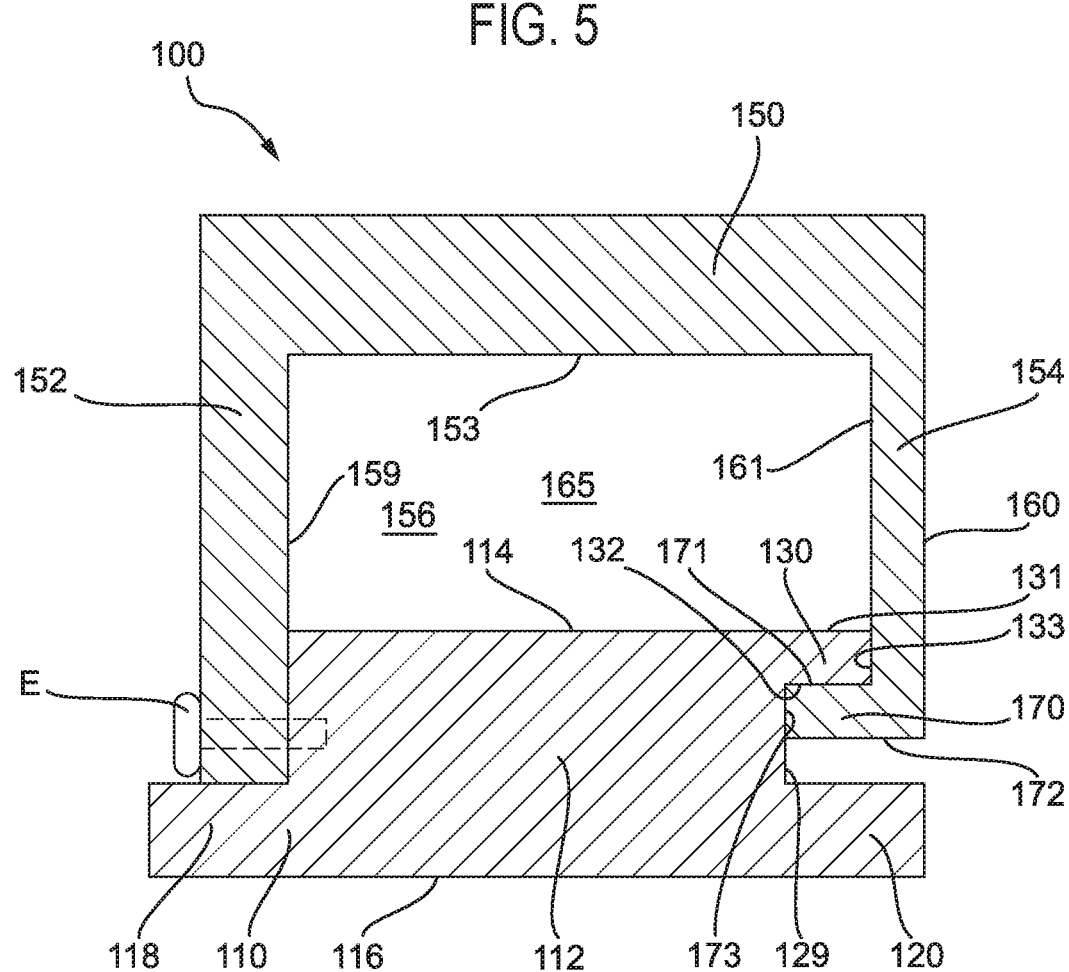

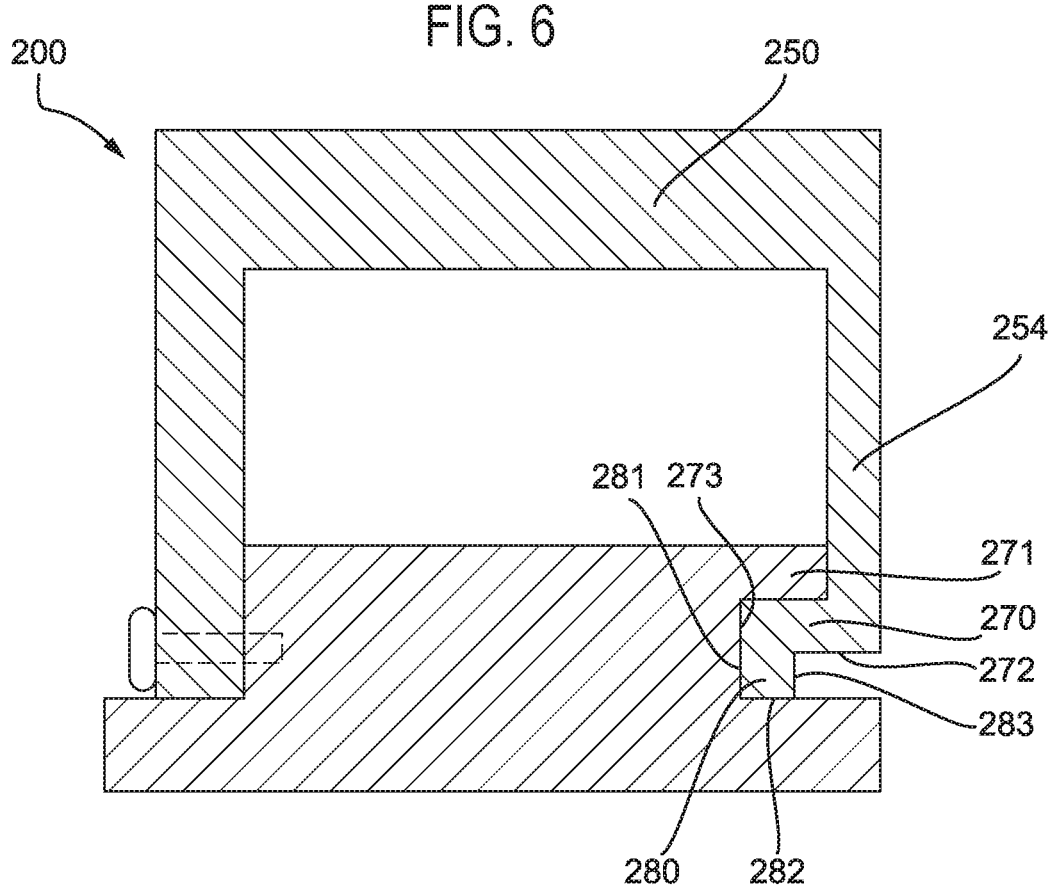
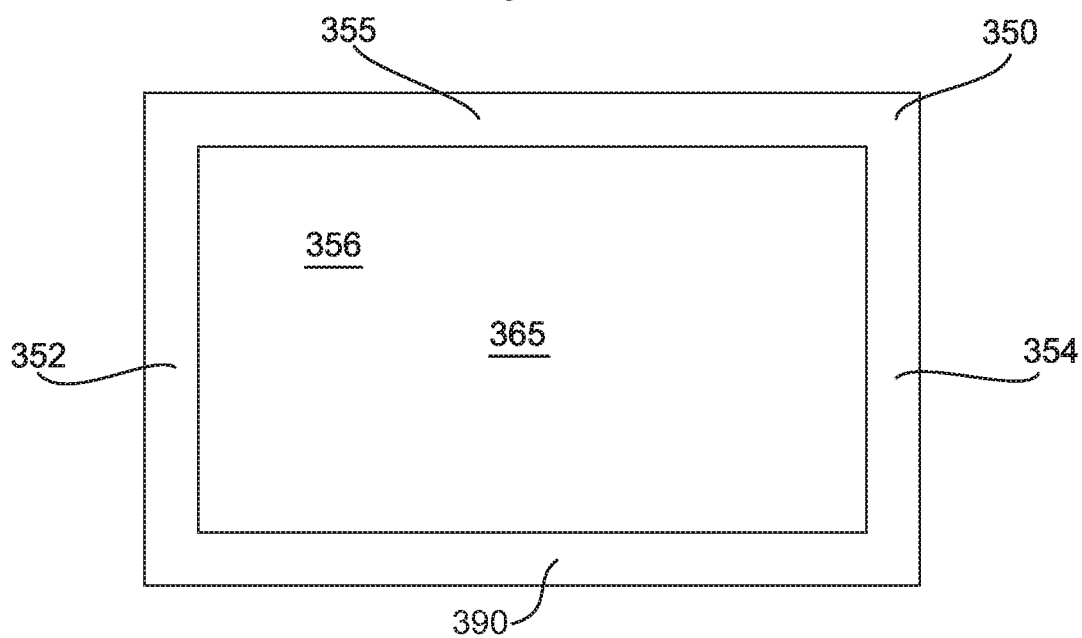

VEHICLE MOUNT

CROSS REFERENCE TO RELATED APPLICATION

The present application claims priority to United Kingdom patent application No. 1815757.8, filed on Sep. 27, 2018. The entire contents of the above-listed application are hereby incorporated by reference for all purposes.

FIELD

The present disclosure relates to a vehicle mount for attachment to a structural member of a vehicle. In one example, the present disclosure relates to a vehicle mount for attachment to a side rail of a vehicle, for example a motor vehicle.

BACKGROUND/SUMMARY

As structural members of some example vehicles become thinner, for example due to factors such as tire clearance envelopes and powertrains growing in size, the size of attachment portions of some vehicle mounts may increase so that they can attach to the thinner structural members. Narrower structural members, such as side rails of vehicles, may mean that vehicle mounts need to be designed differently to facilitate their attachment to such a narrower structural member.

The present disclosure generally relates to a vehicle mount for attachment to a structural member of a vehicle that does not reduce the space in the vehicle mount for receipt of an arm. An example of an arm to be received is an arm attachable to a component of a vehicle, such as an internal combustion engine (ICE).

In one example there is provided a vehicle mount comprising a first member configured to attach to a structural member of a vehicle and a second member comprising first and second limbs, the first and second limbs defining a space therebetween for receipt of an arm attachable to a component of the vehicle. The second member is configured to attach to the first member such that, when the second member is attached to the first member, the space between the first and second limbs defines an opening for receipt of an arm attachable to the component of the vehicle, with a dimension of the opening being equal to the distance between the first and second limbs. The first member may comprise a central body portion and at least one flange protruding away from the central body portion. Each flange may comprise a surface that is continuous with, and contained in the same plane as, a surface of the central body portion. The second member may comprise a portion to engage the flange of the first member such that, when the second member is attached to the first member, engagement between the flanged portion and the second member may fix the position of the second member relative to the first member.

The second member may comprise first and second limbs protruding away from a central body portion of the second member. The central body portion may comprise a raised end surface, and wherein, when the second member is attached to the first member, the raised end surface may be received in the second member between the two limbs.

The first member may comprise a central body portion and at least one flange protruding away from the central body portion, and the central body portion may comprise a raised end surface, and wherein, when the second member is attached to the first member, the raised end surface may be received in the second member between the two limbs, and wherein the second member may comprise a hole for receipt of at least one fastener, such that, when the second member is attached to the first member, the at least one fastener may be configured to be received in the hole such that the at least one fastener extends through one of the two limbs of the second member and into the central body portion of the first member. A fastener may laterally fasten the second member to the first member.

The second member may comprise a body portion comprising an inner surface, and two limbs each extending away from the body portion at an end of the body portion, each limb may comprise an inner surface. The inner surfaces of the limbs may face each other, and the space between the limbs may be defined by the space between the two limb inner surfaces and the inner surface of the second member. The opening may be defined by the inner surface of the second member, the inner limb surfaces, and an end face of the first member.

The first member may comprise a central body portion, which may comprise first and second axially opposing end faces, and wherein the second member may comprise a body portion comprising an inner surface, and two limbs each extending away from the body portion at an end of the body portion, each limb comprising an inner surface, wherein the inner surfaces of the limbs may face each other, and wherein the space between the limbs may be defined by the space between the two limb inner surfaces and the inner surface of the second member, and wherein the opening may be defined by the inner surface of the second member, the inner limb surfaces, and the first end face of the central body portion, wherein the second end face of the central body portion may comprise a hole for receipt of at least one fastener to attach the first member to the structural member of the vehicle.

The second member may comprise two limbs, and a flange extending approximately at right angles from one of the two limbs.

The first member may comprise a flange extending away from a central body portion of the first member, and wherein, when the second member is attached to the first member, the flange of the first member may be engaged with the flange of the second member.

At least one of the first and second members may comprise a hinge, and wherein one of the first and second members may be configured to be attached to the other of the first and second members at the hinge, thereby permitting hinged movement of the first and second members relative to each other. In another embodiment. The second member may be slidably attachable to the first member.

The mount may connect a component of a vehicle to a structural member of the vehicle, which may be at least one rail of the vehicle. A component of the vehicle may be at least one of: a component of a drive train of the vehicle, a component of an engine of the vehicle, and a component of a cab of the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 depicts an embodiment of a first and second member of a vehicle mount in a side view.

FIG. 5 depicts an embodiment of a first and second member of a vehicle mount in a side view.

FIG. 6 depicts an embodiment of a first and second member of a vehicle mount in a side view.

FIG. 7 depicts an embodiment of a first and second member of a vehicle mount in a top view.

FIGS. 1-10B are shown approximately to scale

DETAILED DESCRIPTION

The following description relates to systems and methods for a vehicle mount. The Figures depict different views of various embodiments of vehicle mounts to aid in understanding of the application. As will be described, the configurations of the embodiments allow for a small form factor of the vehicle mount, space to receive mounting components, distribution of forces, as well as other benefits.

Figure 2:
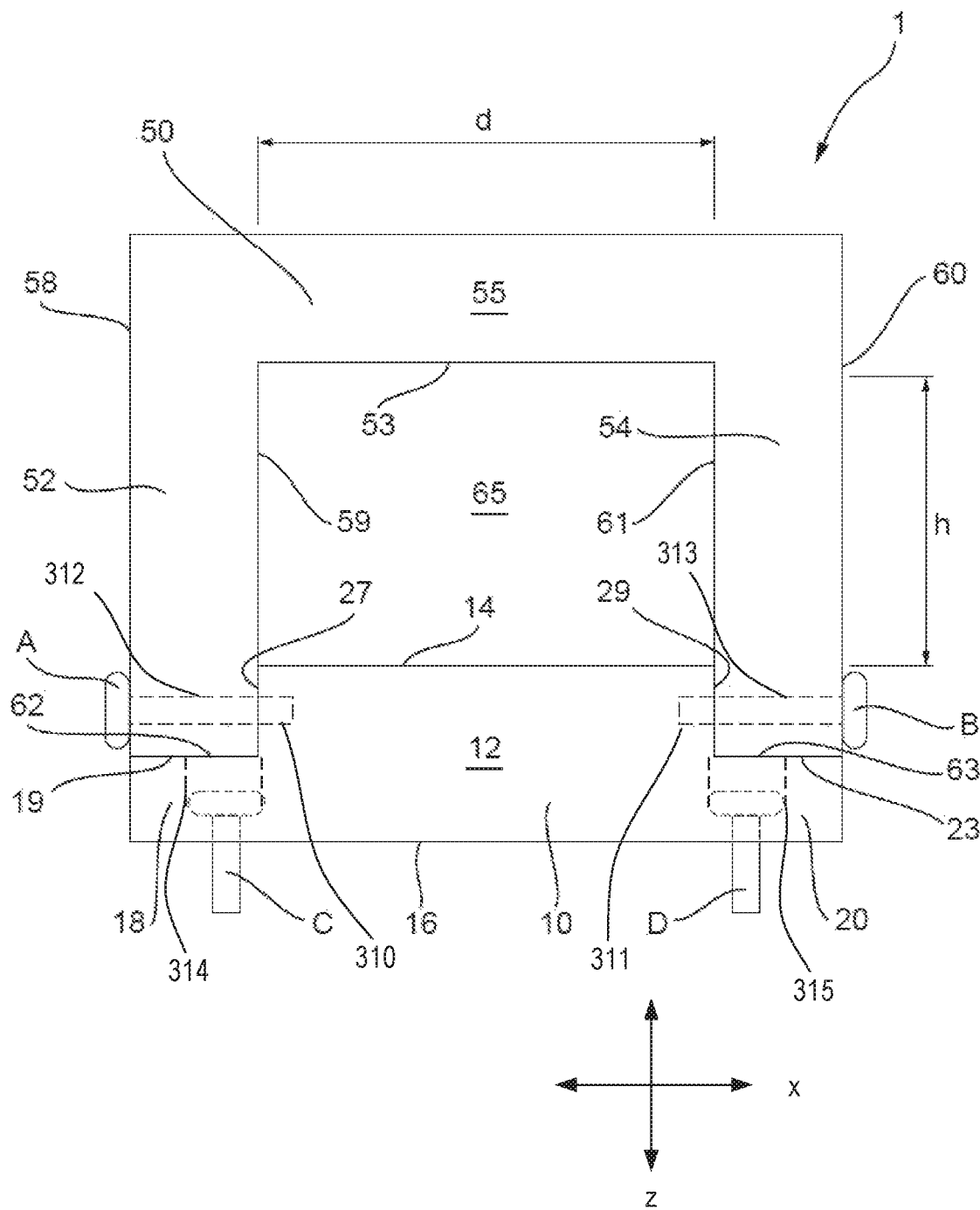
FIG. 2 depicts an embodiment of a first and second member of a vehicle mount in a side view.
Figure 3:
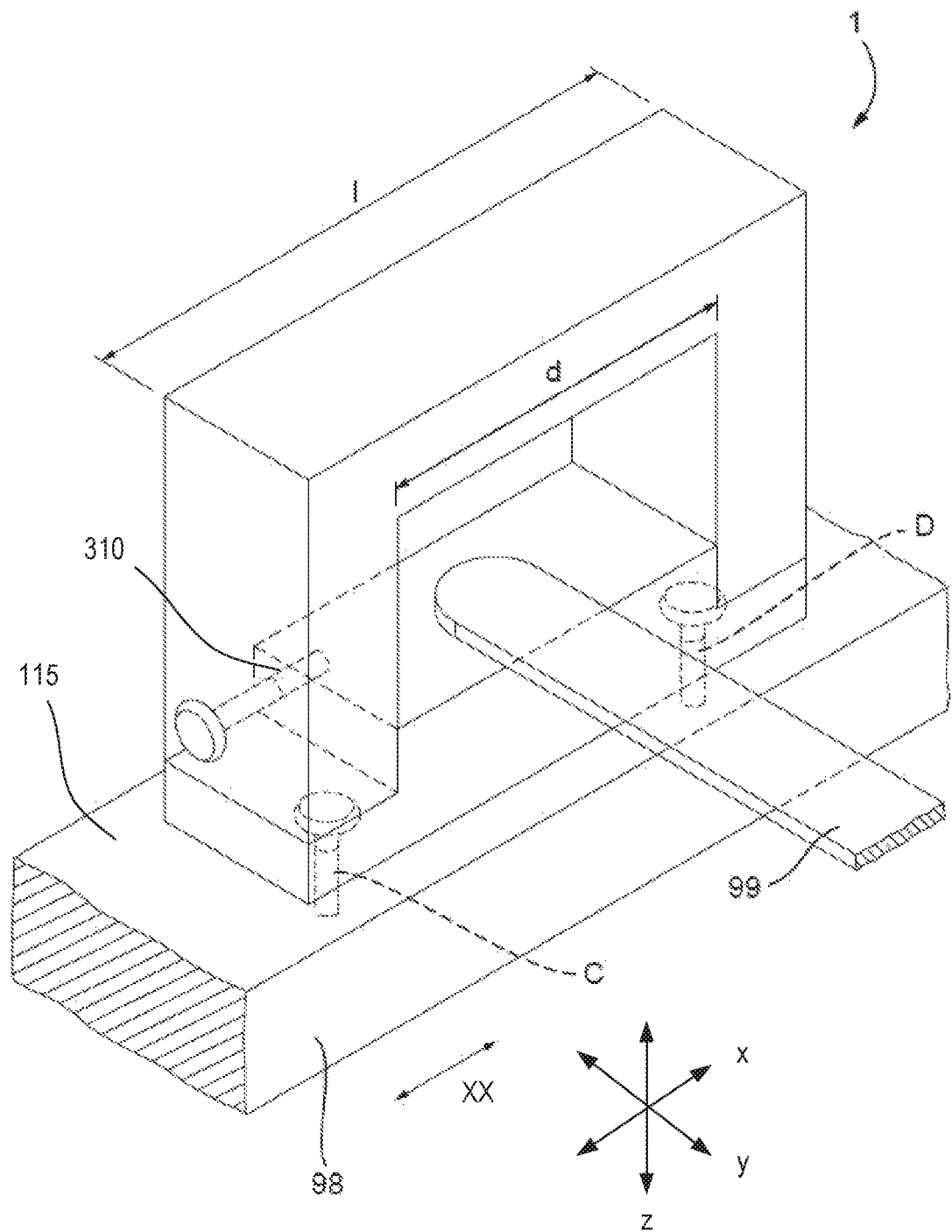
FIG. 3 depicts an embodiment of a first and second member of a vehicle mount, structural member, and arm.

The Figures will be described with reference to an axis system to aid in understanding of the embodiments. The axis system is depicted in FIG. 3. An x-axis extends in a lengthwise direction of structural member 98. The z-axis is perpendicular to the x-axis and extends perpendicular to a face 115 of the structural member 98 which receives the first member 10. The y-axis extends in direction perpendicular to the x-axis and z-axis. The axis system is also shown in FIG. 2 with the x-axis extending in a direction of second face 16 and the z-axis extending perpendicular to the x-axis and second face 16. The y-axis is not depicted in FIG. 2 as it would extend out of the page.

FIG. 1 shows an embodiment of a vehicle mount 1 comprising a first member 10 and a second member 50. The first member 10 is configured to attach to a structural member of a vehicle. The second member 50 comprises first and second limbs 52, 54. The first and second limbs 52, 54 define a space 56 therebetween for receipt of an arm attachable to a component of a vehicle.

An embodiment of the first member 10 comprises a central body portion 12. The central body portion 12 comprises two axially opposing end faces, a first face 14 and a second face 16. First and second axially opposing end surfaces 14, 16 are therefore first and second axially opposing end surfaces of the first member 10. The first member 10 also comprises first and second protrusions 18, 20. Each protrusion is a flanged portion of the central body portion 12 and extends from an opposing peripheral outer surface of the central body portion 12.

For example, as shown in FIG. 1, an embodiment of the first protrusion 18 has first and second opposing surfaces 17, 19, and a side surface 15 connecting the first and second opposing surfaces 17, 19. The second protrusion 20 has first and second opposing surfaces 21, 23, and a side surface 25 connecting the first and second opposing surfaces 21, 23. The first surface 17 of the first protrusion 18 and the first surface 21 of the second protrusion 20 are continuous with the second end surface 16 of the first member 10. The first surfaces 17, 21 are therefore continuous with each other. Therefore the first surfaces 17 and 21 lie in the same plane, and lie in the same plane as the second end surface 16. The second surface 19 of the first protrusion 18 and the second surface 23 of the second protrusion 20 are connected to the first end surface 14 of the first member 10 via two side surfaces 27, 29 of the central body portion 12 of the first member 10. That is, the second surface 19 of the first protrusion 18 is connected to the first end surface 14 of the first member 10 via a first side surface 27 of the central body portion 12. In other words, the first end surface 14 is raised above the second surfaces 19 and 23 of the protrusions 18 and 20. The side surfaces 27 and 29 extend in a z-direction to connect the first end surface 14 and second surfaces 19 and 23. The second surface 21 of the second protrusion 20 is connected to the first end surface 14 of the first member 10 via a second side surface 29 of the central body portion 12. The surfaces 15, 25 are on either side of the central body portion 12 and face away from each other. The surfaces 27, 29 are on either side of the central body portion 12 and face away from each other. In this way, the first member comprises a substantially T-shaped cross section.

Collectively, the surfaces 17, 15, 19, and 27 and protrusion 18 may be regarded as a first side section of the first member 10, and the surfaces 21, 23, 25, and 29 and protrusion 20 may be regarded as a second side section of the first member 10. The part of the central body portion 12 between the two side sections may be regarded as a raised central body portion 12.

As also shown in FIG. 1, an embodiment of the second member 50 comprises a distal outer surface 51 and a distal inner surface 53. Distal outer and inner surfaces 51, 53 are opposing axial end surfaces, or faces, of a body portion 55 of the second member 50. The first and second limbs 52, 54 of the second member 50 protrude away from the body portion 55. Each limb 52, 54, protrudes away from an opposing terminal end of the body portion 55.

An embodiment of the first limb 52 comprises a first limb outer surface 58 and a first limb inner surface 59. The second limb 54 comprises a second limb outer surface 60 and a second limb inner surface 61. The first limb inner and outer surfaces 58, 59 are connected to each other via a first limb end surface 62. The second limb inner and outer surfaces 60, 61 are connected to each other via a second limb end surface 63. Therefore, the first limb 52 is defined by first limb outer surface 58, first limb end surface 62, and first limb inner surface 59; and the second limb 54 is defined by second limb outer surface 60, second limb end surface 63, and second limb inner surface 61. The first limb 52 is connected to the second surface body portion 55 at an end opposite to the first limb end surface 62. The second limb 54 is connected to the second surface body portion 55 at an end opposite to the second limb end surface 63. The first and second inner limb surfaces 59, 61 face each other. The first and second outer limb surfaces 58, 60 face away from each other. In this way, the second member comprises a substantially U-shaped cross section.

As shown in FIG. 1, an embodiment of the distal outer surface 51 of the second member 50 is at right angles with respect to the outer limb surfaces 58, 60. Outer limb surfaces 58, 60 are at right angles with respect to end surface 61, 63, respectively, which are at right angles to inner limb surfaces 59, 61, respectively, which are at right angles to the distal inner surface 53. In other examples, however these angles may be approximate, or different.

As will be explained in further detail below, when the first member 10 is attached to the second member 50, the space 56 between the first and second limbs 52, 54, defines an opening for receipt of an arm, the arm being attachable to a component of a vehicle. The space 56 between the first and second limbs 52, 54, is delimited by the first and second inner limb surfaces 59, 61, and the distal inner surface 53. As will be appreciated from FIG. 1, a dimension of this opening is equal to the distance between the first and second limbs 52, 54 of the second member 50.

As will also be appreciated from FIG. 1, at least part of the space 56 is for receipt of at least part of the first member 10. Specifically, at least part of the space 56 is for receipt of the central body portion 12 of the first member 10. For example, at least part of the space 56 may be for receipt of the part of the central body portion 12 delimited by the first end surface 14, and side central body portion surfaces 27, 29. In this example, the distance between the two inner limb surfaces 59, 61, may be approximately equal to the distance between the two central body portion side surfaces 27, 29, enabling a substantial friction fit between the central body portion 12 and the two limbs 59, 61 (thereby enabling a substantial friction fit between the two members 10, 50).

FIG. 2 shows an embodiment of the vehicle mount 1 when the first member 10 is attached to the second member 50. It will be appreciated that, when the first member 10 is attached to the second member 50, the first and second limbs 52, 54 of the second member 50 define an opening 65 for receipt of an arm attachable to a component of a vehicle. The space (56, see FIG. 1) between the first and second limbs 52, 54 defines the opening 65. The opening 65 is defined by the first and second inner limb surfaces 59, 61, the distal inner surface 53 of the second member 50 and the first end surface 14 of the central body portion 12.

When the second member 50 is attached to the first member 10, the first side surface 27 abuts the first limb inner surface 59 and the second side surface 29 abuts the second limb inner surface 61, the first limb end surface 62 abuts the second surface 19 of the first protrusion 18, and the second limb end surface 63 abuts the second surface 23 of the second protrusion 20. Attachment between the first and second members 10, 50 may therefore be via engagement between at least one pair of these respective surfaces.

An embodiment of the vehicle mount 1 fixes the position of the first and second members 10, 50 relative to each other, with at least one fastener. In the example depicted in FIG. 2, a first fastener A extends through the second member 50 and into the first member. First fastener A extends into a hole 312 in the first limb 52 via the first limb outer surface 58, through the first limb 52, out of the first limb 52 via the first limb inner surface 59, and into a hole 310 the central body portion 12 of the first member 10 via the first side surface 27. Similarly, a second fastener B extends through the second member 50 and into the first member. Second fastener B extends into a hole 313 in the second limb 54 via the second limb outer surface 60, through the second limb 54, out of the first limb 54 via the second limb inner surface 61, and into a hole 311 in the central body portion 12 of the first member 10 via the second side surface 29. In this way at least one of the fasteners A and B will fix the relative position of the first and second members 10, 50. The fasteners A and B may each extend laterally through the second member 50 and into the first member 10. The fasteners may each extend into the second member 50 from an opposing side of the second member 50.

To attach an embodiment of the vehicle mount 1 to a structural member of a vehicle, the first member 10 may be attached to a structural member of a vehicle, and the second member 50 may be attached to the first member 10, as described above with reference to FIG. 2. One example way of attaching the first member 10, and therefore the vehicle mount 1, to a structural member of a vehicle is shown in FIG. 2. Two fasteners C and D, extend from inside the central body portion 12 outside the central body portion 12. In one example, the two fasteners C, D may extend out of the central body portion 12, and therefore outside of the first member 10, via the second end surface 16 (e.g. a central portion thereof). In another example, the two fasteners C, D may extend out of the central body portion 12, and therefore outside of the first member 10, via the first surface 17 of the first protrusion 18 and the first surface 21 of the second protrusion 20, respectively. Therefore, in one example, two fasteners C, D may extend out of the first member 10 at opposing distal ends.

To connect, or attach, an embodiment of the vehicle mount 1 to a structural member of a vehicle, two holes, each corresponding to one of the fasteners C, D, may be provided in the structural member. The part of the fasteners C, D protruding out of the first member 10 may each be received in a respective hole 314, 315 of the structural member. A nut, for example, may then be placed along the fastener to prevent disconnection between the structural member and the vehicle mount 1. For example, at least one of the fasteners C, D, may be a threaded fastener, and a threaded nut may be used to secure the structural member against the first member 10.

As above, an embodiment of the second member 50 comprises a space 56 between the first and second limbs 52, 54. This space defines an opening 65 for receipt of another article, e.g. an arm. A first dimension of the opening 65 is equal to the distance between the first and second limbs 52, 54. For example, as is shown in FIG. 2, a length d of the opening 65 is equal to the distance d between the first and second limbs 52, 54 of the second member 50, e.g. the distance between the first and second limb inner surfaces 59, 61. As is also shown in FIG. 2, when the second member 50 is attached to the first member 10, a second dimension h of the opening 65 (this may be termed the height of the opening 65) is equal to the distance between the distal inner surface 53 of the second member 50 and the first end surface 14 of the first member 10. As such, in the example of FIG. 2, two dimensions of the opening 65 are defined by the distance between the first and second limbs, 52, 54, and the distance between the distal inner surface 53 and the first end surface 14, respectively. Therefore, in this example, the opening 65 may be a closed opening delimited, or defined, by the distal inner surface 53, the first limb inner surface 59, and the first end surface 14 of the first member 10, and the second limb inner surface 61.

As will be appreciated, to facilitate attachment therebetween, embodiments of the first and second members may be complementarily designed. For example, and as shown in FIG. 2, the first member 10 may comprise a substantially T-shaped cross section and the second member 50 may comprise a U-shaped cross section. The body of the 'T' may be defined by the central body portion 12 and the limbs of the 'T' may be defined by the two protrusions (or flanges, or side sections) 18, 20. Similarly, the limbs of the 'U' may be defined by the first and second limbs 52, 54. The two members may be dimensioned such that they may be attached together via a friction fit. For example, a dimension of the first end surface 14 of the first member 10 may be equal to the distance d between the first and second inner limb surfaces 59, 61. In other examples, the mechanism of attachment may be different. For example, attachment between the first and second members 10, 50 may be via abutment, e.g. abutment between the end surfaces 62, 63 (of the first and second limbs 52, 54, respectively), and the second surfaces 19, 23 (of the first and second protrusions 18, 20, respectively). In this way, an attachment may be a 'loose' connection.

The opening 65 defines a potential travel distance for an armature received therein as can be seen in FIG. 3. FIG. 3 shows an embodiment of the vehicle mount 1, with the first and second members 10, 50 attached as shown in FIG. 2, with an arm 99 attached. It will be appreciated that the arm is received in the opening 65 of the vehicle mount 1. As is also shown in FIG. 3, the vehicle mount 1 is attached to a structural member 98 of a vehicle. The vehicle mount 1 is attached to the structural member 98 via fasteners C and D that extend through and out of the first member 10. As is shown in FIG. 3, the arm 99 is attached to the first surface 14 of the first member 10. The arm 99 may be attached to a top surface of the first member 10.

The structural member 98 may be, for example, a vehicle side rail. The arm 99 may be attached to an engine, for example an ICE, positioned near the middle of the vehicle. In this example, the vehicle may travel forwards or backwards, in the direction of travel indicated in FIG. 3 by the arrow XX. Therefore, during instances of heavy acceleration or deceleration, the arm 99 itself may be subject to a force in the direction of arrow XX. The dimension d of the opening 65 may therefore be regarded as a possible travel distance for the arm 99, or any mounting element attached thereto (see FIG. 4). In this way, in the event of sudden or heavy acceleration or deceleration, the arm 99 is constrained to move within the opening 65.

As will be appreciated, the complementary configuration of the first and second members 10, 50, allows the dimension d of the opening to be maximized without significantly increasing the overall footprint of the vehicle mount 1. For example, one embodiment of the difference between the dimension d of the opening 65 differs from the length l of the vehicle mount 1 only by the lengths of the first and second limbs 52, 54 of the second member 50.

A force acting on the arm 99 may cause it to move within the opening 65. Maximizing the opening in this way may reduce the force that the arm 99 applies to another component, e.g. one of the limbs 52, 54, when it moves. Thus, in turn, maximizing the opening dimension d may allow for distribution of forces.

An offset bolt pattern may be used to attach the first member 10 to the structural member 98. For example, each of the fasteners C and D may be part of a group of fasteners, with each fastener in the group being offset from one another.

Figure 4:
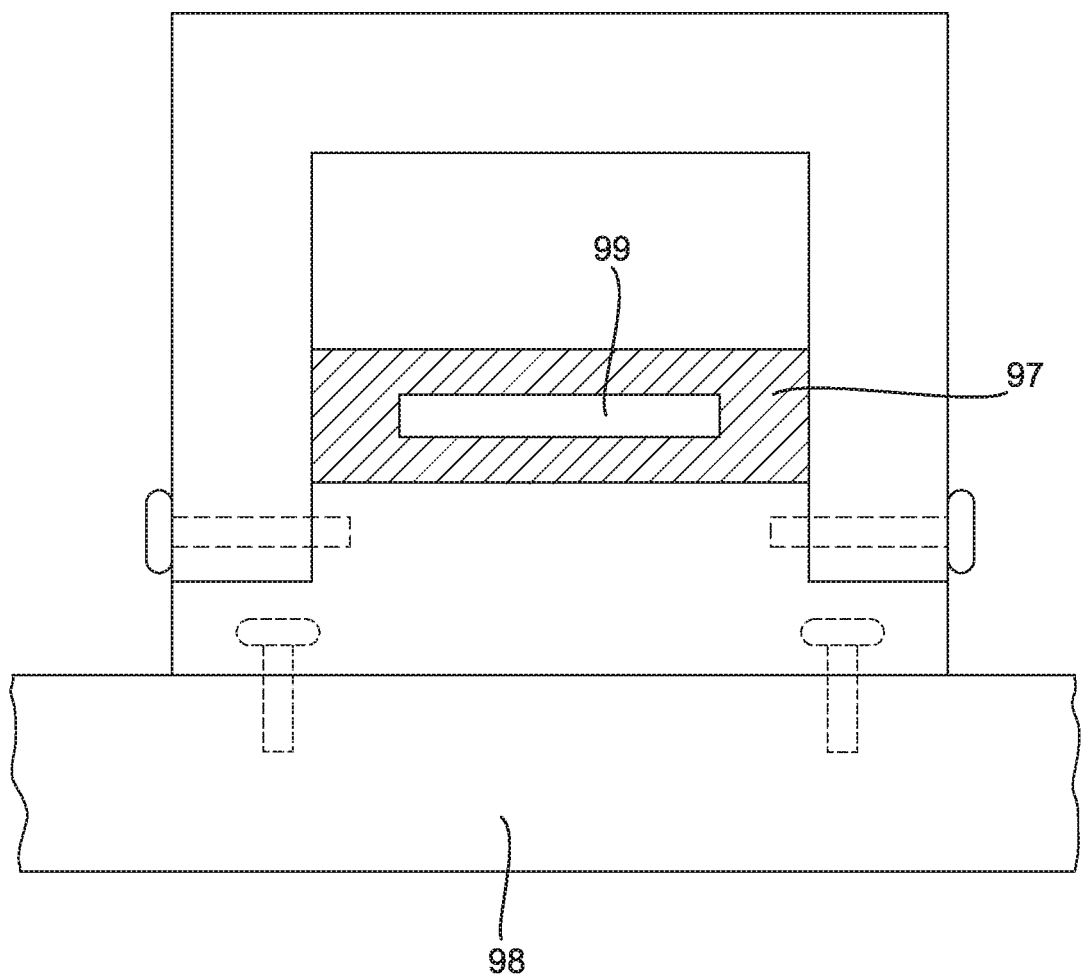
FIG. 4 depicts an embodiment of a first and second member of a vehicle mount, structural member, and arm in a side view.

FIG. 4 shows an embodiment of the vehicle mount 1 and structural member 98 is also shown. In the example of FIG. 4, the arm 99 is received in the space 56 of the vehicle mount 1, however the arm 99 is received in a resiliently deformable element 97, and the resiliently deformable element 97 is received in the space 65. As stated with reference to FIG. 3, the dimension d of the opening constrains the space within which the arm 99 and resiliently deformable element 97 are able to move. In this example, a force applied to the arm 99 may cause it to move within the resiliently deformable element 97, which is constrained to move within the opening 65. Thus, deformation of the resiliently deformable element 97 may help to distribute forces.

FIG. 5 shows an example vehicle mount 100. FIG. 5 shows a vehicle mount 100 comprising a first member 110 and a second member 150. The first member 110 is configured to attach to a structural member (not shown in FIG. 5) of a vehicle. The second member 150 comprises first and second limbs 152, 154. The first and second limbs 152, 154 define a space 156 therebetween for receipt of an arm attachable to a component of a vehicle. The first member 110 comprises a central body portion 12, first and second opposing end surfaces 114, 116, and first and second protrusions, or flanged portions 118, 120.

The example of FIG. 5 differs from the example of FIGS. 1-4 in that the first member 110 comprises a third protrusion 130. The third protrusion 130 comprises first and second opposing surfaces 131, 132, and a side surface 133 connecting the first and second opposing surfaces 131, 132. The first surface 131 of the third protrusion 130 which is continuous with the first end surface 114 of the first member 110. The first surface 131 of the third protrusion 130 is in the same plane as the end surface 114 of the first member 110. The second side surface 129 of the first member 110 is in between the second and third protrusions. Specifically, the second surface 123 of the second protrusion 120 is connected to the second side surface 129 of the first member 110, and the second side surface 129 is connected to the second surface 132 of the third protrusion 130.

In the example of FIG. 5, members 110 and 150 are complementarily designed. For example, the second limb 154 of the second member 150 comprises a first flange 170. The first flange 170 is disposed at a distal end of the second limb 154. The first flange 170 comprises first and second opposing surfaces 171, 172, and an end surface 173. The end surface 173 connects the first and second opposing surfaces 171, 172. The outer surface 160 of the second limb 154 (rather than connecting to the limb end surface as in FIGS. 1-4), in FIG. 5, connects to, or joins, the second flange surface 172. Similarly, the inner surface 161 of the second limb 154 (rather than connecting to a limb end surface as in FIG. 1-4), in FIG. 5, connects to the first flange surface 171. In the example of FIG. 5, the first flange surface 171, and the second limb inner surface 161 are at right angles, the first flange surface is at right angles to the flange side surface 173, the flange side surface 173 is at right angles to the second flange surface 172, and the second flange surface 172 is at right angles to the second limb outer surface 160.

It will be appreciated that the two flanges, 130 and 170, through complementary engagement, may facilitate attachment between the two members 110 and 150, and attachment between the two members 110, 150 may be via the engagement between the two flanges. In one example, at least one of the flanges 130, 170 may be a protrusion and the other may be considered an opening for receipt of the protrusion.

An optional fastener E may be used to further secure the two members 110, 150 together.

The distance between the two limbs 152, 154, defines a space 156 therebetween. This space 156 defines an opening 165 for receipt of an arm. When the second member 150 is attached to the second member 110, as shown in FIG. 5, the space 165 is defined by the distal inner surface 153 of the second member 150, the two limb inner surfaces, 159, 161, and the first end surface 114 of the first member 110. A dimension of the opening 165 is equal to the distance between the two limb inner surfaces 159, 161.

It will be appreciated, that the first member 110 and the second member 150 may be attached to one another via the hook-like attachment between the two flanges 130, 170. In other words, the second member 150 may hook over and onto the first member 110 via the two flanges 130, 170.

FIG. 6 shows another example vehicle mount 200. The vehicle mount 200 of FIG. 6 is similar to the vehicle mount shown in FIG. 5 but for the following features. The second member 250 in the vehicle mount of FIG. 6 example comprises a second limb 254. The second limb 254 comprises a first flange 270 and a second flange 280. The second flange 280 is an extension, and/or protrusion, of the first flange 270. In this way, the first flange 270 comprises a protrusion that is the second flange 280. As shown in FIG. 6, the first flange 270 has first and second surfaces 271, 272. The first flange 270 has a side surface 273 that connects, or joins, the first and second surfaces 271, 272. The second flange 280 has first and second opposing surfaces 281, 283 and an end surface 282. The side surface 273 of the first flange 270 is continuous with the first surface 281 of the second flange 280. The side surface 273 is in the same plane as the first surface 281. The first surface 281 of the second flange 280 is connected to the end surface 282 and the end surface 282 is connected to the second surface 283, which is connected to the second surface 272 of the first flange 270. First surface 281 is at right angles to the end surface 282 the end surface 282 is at right angles to the second surface 283, the second surface 283 is at right angles to the second surface 272. As will be seen from FIG. 6, surfaces 271, 272, and 282 are parallel with one another; and surfaces 273, 281, and 283 are parallel with one another.

It will be appreciated that the vehicle mount 200 of the FIG. 6 example may be assembled by sliding the first and second members 210, 250 into engagement with one another.

FIG. 7 shows an example of second member 350. In this example the second member 350 comprises two opposing body portions 355, 390, and two opposing limbs 352, 354. In this example, the four elements 355, 390, 352, 354 give the second member 350 a frame-like cross section. In this example, the second member 350 may be attached to a first member, via at least one fastener extending into and through the second body portion 390 and into the first member. As with other examples, the second member 350 of the FIG. 7 example comprises first and second limbs 352, 354 which define a space therebetween 356. This space defines an opening 365 for receipt of an arm which, in this example, is attachable to the second body portion 390 of the second member 350. Thus, in the FIG. 7 example, then the second member 350 is attached to a first member to form the vehicle mount, the arm may be attached to the second member and not to the first member (as in the examples of FIGS. 1-6).

Other mechanisms of attaching the first member to the second member will be appreciated. For example, at least one of the first and second members may comprise a hinge attachment to hingedly attach the two members together.

Figure 8A:
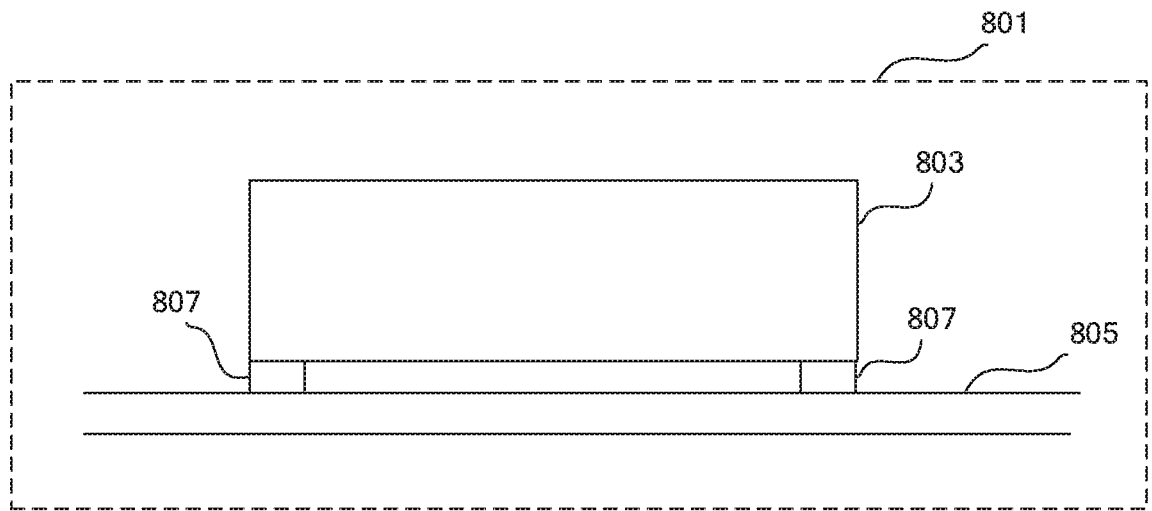
FIG. 8A depicts an embodiment of an engine, vehicle mounts and structural member in a side view.
Figure 8B:
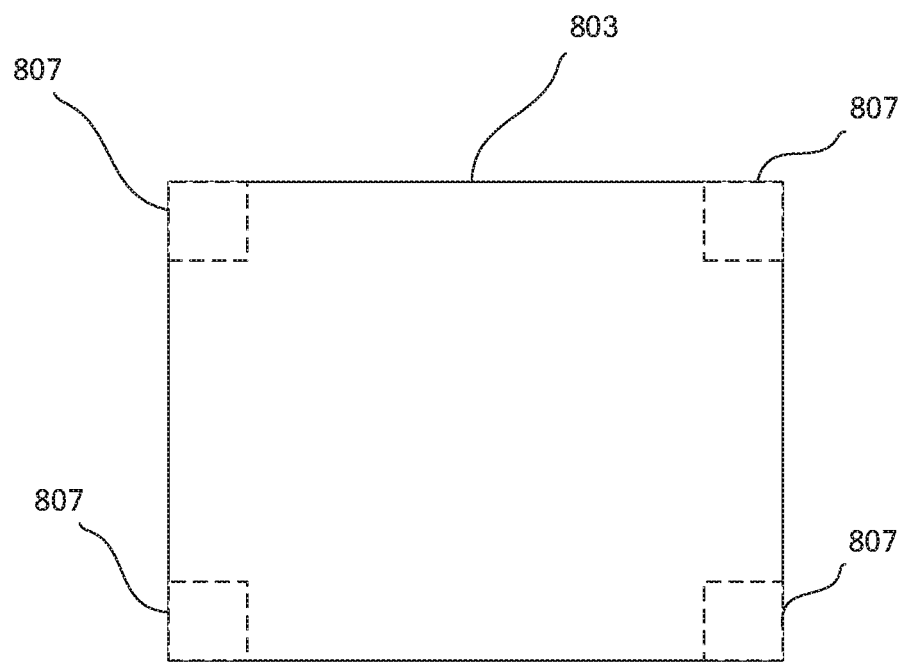
FIG. 8B depicts an embodiment of an engine, vehicle mounts and structural member in a top view.

FIGS. 8A and 8B depict an embodiment of a vehicle 801 including an engine 803, frame rail 805, and vehicle mounts 807. The vehicle mounts 807 may be positioned in many configurations. FIG. 8B depicts one embodiment where vehicle mounts 807 are positioned at four corners of the engine 803. In other embodiments, more vehicle mounts 807 could be used or the mounts could mounted at other positions in order to avoid interference with other vehicle components. FIG. 8A depicts a side view of the engine 803 and vehicle mounts 807 while FIG. 8B depicts a top view. Vehicle mounts 807 may be positioned in many configuration and connected to components that are not an engine without departing from the scope of this application.

Figure 9:
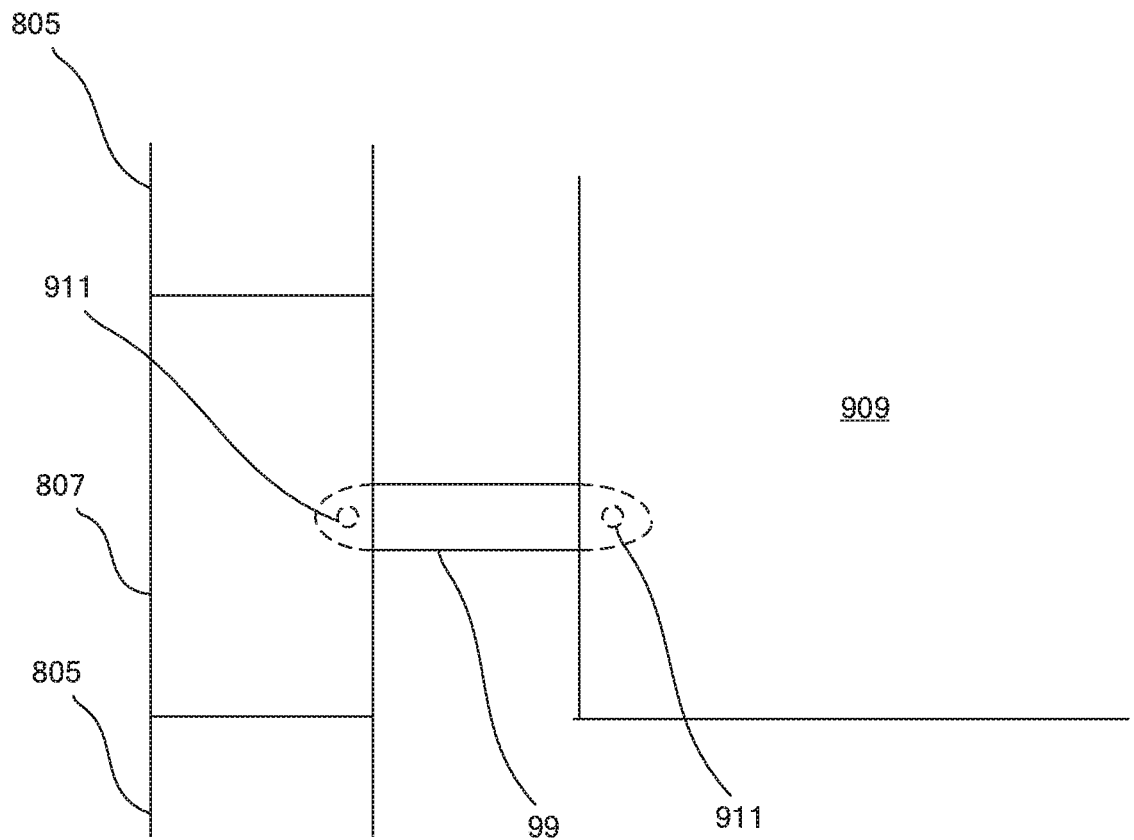
FIG. 9 depicts an embodiment of a vehicle mount, structural member, arm, and a vehicle component in top view.

FIG. 9 depicts an embodiment of a frame rail 805, vehicle mount 807, arm 99, and vehicle components 909. The arm 99 connects the vehicle component 909 to the vehicle mount 807 and thus the frame rail 805. Vehicle component 909 may be part of the drive train of the vehicle. Examples of vehicle component 909 are an engine block or a transmission housing. The vehicle component 909 may also be other types of components such as a passenger cabin. The arm 99 may be used to connect many types of vehicle components 909 to the vehicle mount 807 without deviating from the scope of the application. The arm 99 may be attached to the vehicle components 909 and vehicle mounts 807 by several methods, including complimentary holes and fasteners 911.

Figure 10A:
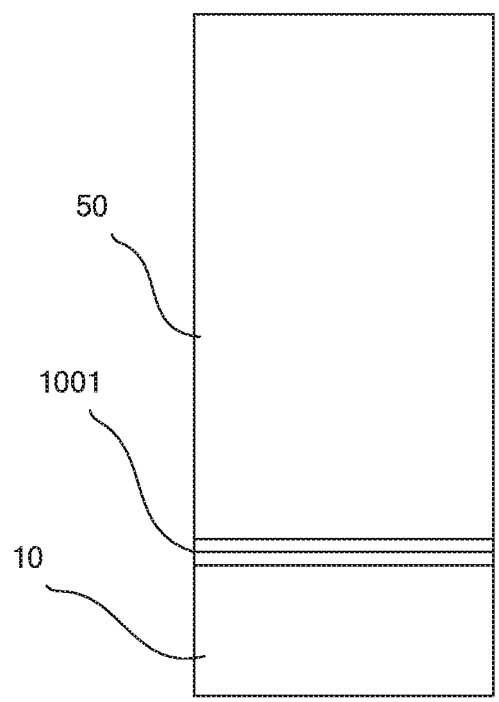
FIG. 10A depicts an embodiment of a first and second member of a vehicle mount in a side view.
Figure 10B:
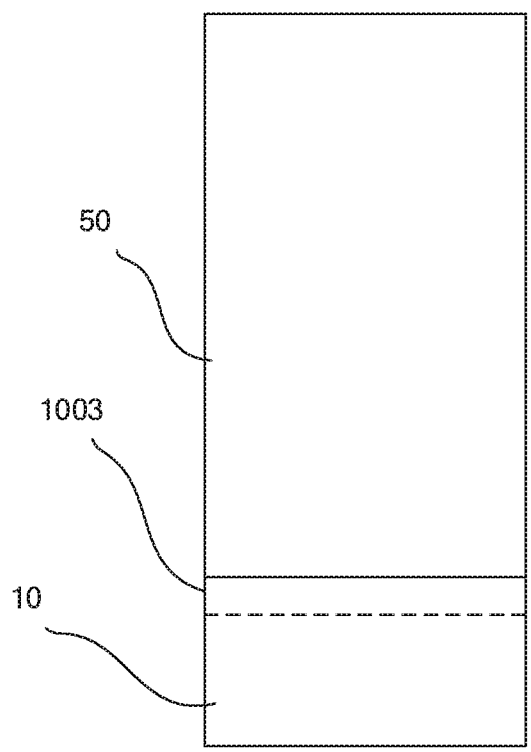
FIG. 10B depicts an embodiment of a first and second member of a vehicle mount in a side view.

FIGS. 10A and 10B depicts embodiments of methods of mounting second member 50 to first member 10. FIG. 10A shows a second member 50 mounted to a first member 10 by a hinge 1001. The hinge 1001 allows for a pivoting of a second member 50 relative to the first member 10. FIG. 10B shows a second member 50 mounted to a first member 10 using a groove and flange 1003. The groove and flange 1003 allows for a sliding movement of a second member 50 relative to the first member 10. These methods of attachment may provide for simpler methods of installation or maintenance.

In this way, vehicle mounts of the application may accommodate small form factors of vehicles such as narrow frame rails. Vehicle mounts of the application may also be used to increase a dimension of an opening to receive a connection to a mounted component without significantly increasing the overall footprint of the vehicle mount. Further, vehicle mounts of the application may allow for movement within the vehicle mount which may distribute forces and reduce force concentrations. These are only some of the benefits of vehicle mounts according to the application. Thus, the technical effect of vehicle mounts with configurations according to the application allow for distribution of forces and greater space to receive components relative to the vehicle mount footprint.

Some of the embodiments of the application are described by the following statements.

A vehicle mount comprising: a first member configured to attach to a structural member of a vehicle; and a second member comprising first and second limbs, the first and second limbs defining a space therebetween for receipt of an arm attachable to a component of the vehicle, wherein the second member is configured to attach to the first member such that, when the second member is attached to the first member, the space between the first and second limbs defines an opening for receipt of an arm attachable to the component of the vehicle, with a dimension of the opening being equal to the distance between the first and second limbs.

A vehicle mount according to the previous statement, wherein the first member comprises a central body portion and at least one flange protruding away from the central body portion.

A vehicle mount according to one of the previous statements, wherein each flange comprises a surface that is continuous with, and contained in the same plane as, a surface of the central body portion.

A vehicle mount according to one of the previous statements, wherein the second member comprises a portion to engage the flange of the first member such that, when the second member is attached to the first member, engagement between the flanged portion and the second member fixes the position of the second member relative to the first member.

A vehicle mount according to any preceding statement, wherein the second member comprises first and second limbs protruding away from a central body portion of the second member.

A vehicle mount according one of the previous statements, wherein the first member comprises a central body portion, wherein the central body portion comprises a raised end surface, and wherein, when the second member is attached to the first member, the raised end surface is received in the second member between the two limbs.

A vehicle mount according to any preceding statement, wherein the first member comprises a central body portion and at least one flange protruding away from the central body portion, wherein the central body portion comprises a raised end surface, and wherein, when the second member is attached to the first member, the raised end surface is received in the second member between the two limbs, and wherein the second member comprises a hole for receipt of at least one fastener, such that, when the second member is attached to the first member, the at least one fastener is configured to be received in the hole such that the at least one fastener extends through one of the two limbs of the second member and into the central body portion of the first member.

A vehicle mount according to any preceding statement, wherein the second member comprises a body portion comprising an inner surface, and two limbs each extending away from the body portion at an end of the body portion, each limb comprising an inner surface, wherein the inner surfaces of the limbs face each other, and wherein the space between the limbs is defined by the space between the two limb inner surfaces and the inner surface of the second member, and wherein the opening is defined by the inner surface of the second member, the inner limb surfaces, and an end face of the first member.

A vehicle mount according to any preceding statement, wherein the first member comprises a central body portion comprising first and second axially opposing end faces, and wherein the second member comprises a body portion comprising an inner surface, and two limbs each extending away from the body portion at an end of the body portion, each limb comprising an inner surface, wherein the inner surfaces of the limbs face each other, and wherein the space between the limbs is defined by the space between the two limb inner surfaces and the inner surface of the second member, and wherein the opening is defined by the inner surface of the second member, the inner limb surfaces, and the first end face of the central body portion, wherein the second end face of the central body portion comprises a hole for receipt of at least one fastener to attach the first member to the structural member of the vehicle.

A vehicle mount according to any preceding statement, wherein the second member comprises two limbs, and a flange extending approximately at right angles from one of the two limbs.

A vehicle mount according to any preceding statement, wherein the first member comprises a flange extending away from a central body portion of the first member, and wherein, when the second member is attached to the first member, the flange of the first member is engaged with the flange of the second member.

A vehicle mount according to any preceding statement, wherein at least one of the first and second member comprises a hinge, and wherein one of the first and second members is configured to be attached to the other of the first and second members at the hinge, thereby permitting hinged movement of the first and second members relative to each other.

A vehicle mount according to any preceding statement, wherein the second member is slidably attachable to the first member.

A vehicle mount according to any preceding statement, wherein the structural member of the vehicle is at least one rail of the vehicle.

A vehicle mount according to any preceding statement, wherein the component of the vehicle is at least one of: a component of a drive train of the vehicle, a component of an engine of the vehicle, and a component of a cab of the vehicle.

FIGS. 1-10B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus ten percent of the value or range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle mount comprising:
   a first member configured to attach to a structural member of a vehicle; and
   a second member comprising first and second limbs, the second member configured to attach to the first member such that, when the second member is attached to the first member, a space between the first and second limbs defines an opening for receipt of an arm attachable to a component of the vehicle,
   two side surfaces of the first member fitting within the space and contacting a respective inner surface of the first and second limbs,
   a hole in at least one of the first and second limbs which aligns with a respective hole in at least one of the side surfaces of the first member, and
   a dimension of the opening being equal to a distance between the first and second limbs.

2. The vehicle mount according to claim 1, wherein the first member comprises a central body portion and at least one flange protruding away from the central body portion.

3. The vehicle mount according to claim 2, wherein each flange comprises a surface that is continuous with, and contained in a same plane as, a surface of the central body portion.

4. The vehicle mount according to claim 2, wherein the second member comprises a portion to engage the at least one flange of the first member such that, when the second member is attached to the first member, engagement between the flanged portion and the second member fixes a position of the second member relative to the first member.

5. The vehicle mount according to claim 1, wherein the first and second limbs protruding away from a central body portion of the second member.

6. The vehicle mount according to claim 5 wherein a central body portion of the first member comprises a raised end surface, and wherein, when the second member is attached to the first member, the raised end surface is received in the second member between the two limbs.

7. The vehicle mount according to claim 1, wherein the first member comprises a central body portion and at least one flange protruding away from the central body portion, the central body portion comprises a raised end surface, and, when the second member is attached to the first member, the raised end surface is received in the second member between the two limbs, and
   when the second member is attached to the first member, at least one fastener is configured to be received in the hole of at least one of the first and second limbs such that the at least one fastener extends through one of the two limbs of the second member and into the central body portion of the first member.

8. The vehicle mount according to claim 1, wherein the second member comprises a body portion comprising an inner surface, and
   the two limbs each extending away from the body portion at an end of the body portion, the inner surfaces of the two limbs face each other, and wherein the space between the limbs is defined by the space between the two inner surfaces of the two limbs and the inner surface of the second member, and
   the opening is defined by the inner surface of the second member, the inner surfaces of the two limbs, and an end face of the first member.

9. The vehicle mount according to claim 1, wherein the first member comprises a central body portion comprising first and second axially opposing end faces, and
   the second member comprises a body portion comprising an inner surface, and two limbs each extending away from the body portion at an end of the body portion, the inner surfaces of the two limbs face each other, and wherein the space between the limbs is defined by the space between the two inner surfaces of the two limbs and the inner surface of the second member, and
   the opening is defined by the inner surface of the second member, the inner surfaces of the two limbs, and the first end face of the central body portion,
   the second end face of the central body portion comprises a hole for receipt of at least one fastener to attach the first member to the structural member of the vehicle.

10. The vehicle mount according to claim 1, wherein the second member comprises two limbs, and a flange extending approximately at right angles from one of the two limbs.

11. The vehicle mount according to claim 1, wherein the first member comprises a flange extending away from a central body portion of the first member, and wherein, when the second member is attached to the first member, the flange of the first member is engaged with the flange of the second member.

12. The vehicle mount according to claim 1, wherein the second member is slidably attachable to the first member.

13. The vehicle mount according to claim 1, wherein the structural member of the vehicle is at least one rail of the vehicle.

14. A vehicle mount comprising:
   a first member configured to attach to a structural member of a vehicle;

a second member comprising first and second limbs, a distance between inner faces of the first and second limbs defining a space, and an arm positioned within the space, the second member configured to attach to the first member;

two side surfaces of the first member fitting within the space and contacting a respective inner face of the first and second limbs; and a hole in at least one of the first and second limbs which aligns with a respective hole in at least one of the two side surfaces of the first member.

15. The vehicle mount according to claim 14, wherein a component of the vehicle is attached to the arm, and the component of the vehicle is at least one of: a component of a drive train of the vehicle, a component of an engine of the vehicle, and a component of a cab of the vehicle.

16. A vehicle mount comprising:

a first member attached to a structural member of a vehicle and comprising two protrusions extending outwardly away from two side surfaces;

a second member comprising first and second limbs, a distance between inner faces of the first and second limbs defining a space;

the two side surfaces of the first member fitting within the space and contacting a respective inner face of the first and second limbs; and holes in each of the first and second limbs which align with a respective hole in each of the two side surfaces of the first member.

17. The vehicle of claim 16, wherein the two protrusions each comprise a hole which aligns with a respective hole in the structural member.

18. The vehicle of claim 16, wherein one of the first and second limbs comprises a flange which engages with a third protrusion of the first member.

19. The vehicle of claim 16, wherein a third protrusion of the first member extends outwardly from one of the two side surfaces, and one of the first and second limbs comprises a flange which engages with a surface of the third protrusion facing the structural member of the vehicle.

\* \* \* \* \*